United States Patent
Proebstle et al.

(10) Patent No.: US 9,434,256 B2
(45) Date of Patent: Sep. 6, 2016

(54) ARRANGEMENT AND METHOD FOR STABILIZING A VOLTAGE APPLIED TO A FIRST ELECTRIC CONSUMING DEVICE ARRANGED IN AN ONBOARD POWER SUPPLY SYSTEM OF A VEHICLE

(71) Applicant: Bayerische Motoren Werke Aktiengesellschaft, Munich (DE)

(72) Inventors: Hartmut Proebstle, Wuerzburg (DE); Rupert Neudecker, Munich (DE); Sherif Mahmoud, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 448 days.

(21) Appl. No.: 13/957,750

(22) Filed: Aug. 2, 2013

(65) Prior Publication Data
US 2013/0313898 A1 Nov. 28, 2013

Related U.S. Application Data

(63) Continuation of application No. PCT/EP2012/051199, filed on Jan. 26, 2012.

(30) Foreign Application Priority Data

Feb. 3, 2011 (DE) .................. 10 2011 003 605

(51) Int. Cl.
*B60L 1/00* (2006.01)
*B60L 3/00* (2006.01)
(Continued)

(52) U.S. Cl.
CPC .. *B60L 1/00* (2013.01); *B60L 1/02* (2013.01); *B60L 11/005* (2013.01); *B60L 11/14* (2013.01);
(Continued)

(58) Field of Classification Search
CPC ........... H02J 7/00; H02J 7/1438; B60L 1/00; B60R 16/03
USPC .................................................. 307/9.1, 10.1
See application file for complete search history.

(56) References Cited

U.S. PATENT DOCUMENTS 5,369,540 A * 11/1994 Konrad ............... B60L 11/1803 361/3
2004/0222771 A1 11/2004 Iwata et al.
(Continued)

FOREIGN PATENT DOCUMENTS

DE 101 49 343 A1 4/2003
DE 102 58 894 B3 1/2004
(Continued)

OTHER PUBLICATIONS

Robert Bosch:, "Autoelektrik Autoelektronik; Kuenftige Bordnetze", Oct. 1, 2002, Stuttgart Germany, XP002655208, pp. 16-19.
(Continued)

*Primary Examiner* — Carlos Amaya
(74) *Attorney, Agent, or Firm* — Crowell & Moring LLP

(57) ABSTRACT

An arrangement and method are provided for stabilizing a voltage applied to a first electric consumer arranged in a vehicle onboard power supply system that includes a second electric consumer. A first voltage supply unit provides a supply voltage; a storage unit stores electric energy; a second voltage supply unit provides a charging voltage; a switching unit is connected to the first consumer, the storage unit, the first voltage supply unit and the second voltage supply unit; and a control unit determines whether a stabilization is to be carried out. If no stabilization is to be carried out, the control unit activates the switching unit such that the first consumer is connected to the first voltage supply unit and, as soon as the stabilization is to be carried out, the first consumer is connected to a series connection formed by the storage unit and the first voltage supply unit.

12 Claims, 4 Drawing Sheets

(51) Int. Cl.
  *H02G 3/00* (2006.01)
  *B60R 16/03* (2006.01)
  *H02J 7/00* (2006.01)
  *H02J 7/14* (2006.01)
  *B60L 1/02* (2006.01)
  *B60L 11/00* (2006.01)
  *B60L 11/14* (2006.01)
  *B60L 11/18* (2006.01)
  *B60L 15/20* (2006.01)

(52) U.S. Cl.
  CPC ........ *B60L 11/1816* (2013.01); *B60L 11/1868* (2013.01); *B60L 15/20* (2013.01); *B60R 16/03* (2013.01); *H02J 7/0031* (2013.01); *H02J 7/0068* (2013.01); *H02J 7/1423* (2013.01); *B60L 2210/40* (2013.01); *B60L 2220/14* (2013.01); *B60L 2240/12* (2013.01); *B60L 2240/423* (2013.01); *B60L 2240/441* (2013.01); *B60L 2240/547* (2013.01); *B60L 2260/26* (2013.01); *Y02T 10/645* (2013.01); *Y02T 10/70* (2013.01); *Y02T 10/7005* (2013.01); *Y02T 10/7022* (2013.01); *Y02T 10/7066* (2013.01); *Y02T 10/7072* (2013.01); *Y02T 10/7077* (2013.01); *Y02T 10/7241* (2013.01); *Y02T 10/7275* (2013.01); *Y02T 90/127* (2013.01); *Y02T 90/14* (2013.01)

(56) References Cited

U.S. PATENT DOCUMENTS

2012/0074775 A1* 3/2012 Winkler ................. B60R 16/03
  307/10.1
2012/0286569 A1  11/2012 Pischke et al.
2013/0062940 A1* 3/2013 Winkler ................. B60R 16/03
  307/10.1

FOREIGN PATENT DOCUMENTS

| DE | 10 2004 023 620 A1 | 12/2005 |
| DE | 10 2005 038 746 A1 | 3/2007 |
| DE | 10 2005 042 154 A1 | 4/2007 |
| DE | 10 2008 027 658 A1 | 12/2009 |
| DE | 10 2009 002 805 A1 | 11/2010 |
| DE | 10 2009 024 374 A1 | 12/2010 |
| DE | 10 2009 028 147 A1 | 2/2011 |
| JP | 2010-110192 A | 5/2010 |
| JP | 2010-119176 A | 5/2010 |
| WO | WO 2009/074604 A1 | 6/2009 |
| WO | WO 2010/142373 A2 | 12/2010 |

OTHER PUBLICATIONS

International Preliminary Report on Patentability (PCT/IB/373), including Written Opinion (PCT/ISA/237) dated Aug. 6, 2013 (eight (8) pages).

Corresponding International Search Report with partial English Translation dated May 2, 2012 (eight (8) pages).

German Search Report with English Translation dated Oct. 13, 2011 (ten (10) pages).

Chinese Office Action issued in counterpart Chinese Application No. 201280007422.0 dated Jan. 7, 2016, with English translation (seventeen (17) pages).

German-language Japanese Office Action issued in counterpart Japanese Application No. 2013-552154 dated Oct. 27, 2015 (five pages).

* cited by examiner

ARRANGEMENT AND METHOD FOR STABILIZING A VOLTAGE APPLIED TO A FIRST ELECTRIC CONSUMING DEVICE ARRANGED IN AN ONBOARD POWER SUPPLY SYSTEM OF A VEHICLE

CROSS REFERENCE TO RELATED APPLICATIONS

This application is a continuation of PCT International Application No. PCT/EP2012/051199, filed Jan. 26, 2012, which claims priority under 35 U.S.C. §119 from German Patent Application No. DE 10 2011 003 605.9, filed Feb. 3, 2011, the entire disclosures of which are expressly incorporated by reference herein.

BACKGROUND AND SUMMARY OF THE INVENTION

The invention relates to an arrangement and a method for stabilizing a voltage applied to a first electric consuming device arranged in an onboard power supply system of a vehicle. In addition to at least one first consuming device, the onboard power supply system also has at least one second electric consuming device and a first voltage supply unit which provides a supply voltage.

To a high degree, vehicles are nowadays equipped with electric components. This ranges from simple mechanisms, such as fans, seat heaters or rear window heaters, to highly complex control systems by which a quantity representing the driving dynamics of the vehicle can be controlled or influenced. Examples of such control systems are systems already being used today for influencing the chassis of a vehicle or systems for controlling the yaw rate of a vehicle. However, systems, such as brake-by-wire or steer-by-wire systems, which can be used in the future, should also be mentioned.

For activating or for maintaining the activation, these electric components have to be supplied with an electric voltage and thereby with electric energy. In this case, it is important that the onboard power supply voltage provided for this purpose is stable over time or is maintained in a stable state, mainly with a view to electrical components which should be classified as being voltage-sensitive. A component is voltage-sensitive if a malfunctioning or function impairment of this component occurring during the driving operation of the vehicle and caused by an instability of the onboard power supply voltage has the result that the driving operation can no longer be maintained unrestrictedly or represents a danger potential for further driving operation. Whereas, with respect to electrical components which are to be classified as non-voltage-sensitive, instabilities in the onboard power supply voltage are less problematic or not problematic at all.

However, especially in the driving operation of a vehicle, there are operations during which fluctuations in the onboard power supply voltage may occur, for example, caused by voltage drops on loads, parasitic resistances or caused by a very high current demand of an electric consuming device. Particularly in the case of vehicles equipped with a so-called automatic start-stop system, instabilities may occur in the onboard power supply voltage when the internal-combustion engine is restarted. In this case, it is unimportant whether a conventional vehicle is involved that is driven exclusively by an internal-combustion engine, or a hybrid vehicle in which an internal-combustion engine as well as an electric machine are provided for the propulsion. Measures for stabilizing the onboard power supply voltage generally have to be taken in the case of hybrid vehicles, particularly vehicles constructed as parallel hybrids.

Instabilities in the onboard power supply voltage may occur mainly when the electric motor is additionally started. In this case, the hybrid vehicle is in an operating state in which it is driven solely by the electric machine, and the internal-combustion engine is started for generating the torque required for the propulsion, instead of the electric machine.

Especially with a view to electrical components that are starting-voltage-sensitive, an onboard supply voltage with a behavior that is stable over time is therefore particularly important. Starting-voltage-sensitive components are those components which react with function impairments or malfunctioning to the considerable onboard power supply voltages that may occur when restarting or additionally starting an internal-combustion engine. This may also involve those components which are relevant to the driving operation of the vehicle during or immediately following a restarting or additional starting operation.

Various measures are known for stabilizing the onboard power supply voltage or for providing a stable onboard power supply voltage. Thus, so-called high-voltage or low-voltage starting systems may be used, which permit the restarting or additional starting of an internal-combustion engine without the occurrence of instabilities in the onboard power supply voltage. Low-voltage starting systems can be used in conventional vehicles as well as in hybrid vehicles.

A vehicle equipped with a low-voltage starting system, in addition to the conventional basic onboard power supply system, has a further starting onboard power supply system which is coupled with the basic onboard power supply system by way of a coupling element, for example, a voltage transformer or a switch. The starting onboard power supply system, which has a separate battery, provides electric energy required for the restarting or additional starting of the internal-combustion engine, while the remaining electrical components installed in the vehicle are supplied by way of the basic onboard power supply system.

The disadvantage of this implementation is that an additional onboard power supply system, specifically the starting onboard power supply system is needed. On the one hand, this results in high costs caused by the components of the starting onboard power supply system itself and by the components required for the coupling of the two power supply systems. On the other hand, the accommodation of the additional components of the starting onboard power supply system is not unproblematic because limited space is available in a vehicle.

High-voltage starting systems are used in the case of hybrid vehicles constructed as parallel hybrids. In the case of such a vehicle, the internal-combustion engine and the electric machine are, as a rule, connected with one another and with the transmission by way of a clutch unit. On the one hand, it thereby becomes possible that the vehicle can be driven solely by the internal-combustion engine or solely by the electric machine or, in a combined manner by both. On the other hand, it is conceivable to implement a restarting or additional starting of the internal-combustion engine while using the electric machine.

This implementation has the disadvantage that the electric machine provided for the driving operation and also the electric accumulator, by which the electric machine is supplied with electric energy, have to have larger dimensions than would actually be necessary because, in addition to the torque causing the vehicle propulsion, it also has to provide a torque causing the restarting or additional starting of the internal-combustion engine. This results in higher costs.

It is therefore an object of the present invention to further develop an arrangement and a method of the above-mentioned type in order to be able to implement the stabilization of a voltage applied to a first electric consuming device arranged in an onboard power supply system of a vehicle, without having to use additional or larger-dimensioned components for this purpose or without having to provide a larger space. An arrangement and a corresponding method, respectively, are to be provided, which are cost-effective and easy to operate.

This and other objects are achieved by an arrangement for stabilizing a voltage applied to a first electric consuming device arranged in an onboard power supply system of a vehicle, the onboard power supply system also having at least one second electric consuming device and a first voltage supply unit which provides a supply voltage. The arrangement includes a storage unit constructed for storing electric energy at least temporarily, a second voltage supply unit for providing a charging voltage, a switching unit to which at least the first electric consuming device, the storage unit, the first voltage supply unit and the second voltage supply unit are connected, and a control unit which is constructed for determining whether a stabilization of the voltage applied to the first electric consuming device is to be carried out. The control unit is further constructed, as long as a stabilization is not to be carried out, for activating the switching unit such that the first electric consuming device is connected to the first voltage supply unit and, as soon as a stabilization is to be carried out, for activating the switching unit such that the first electric consuming device is connected to a series connection formed by the storage unit and the first voltage supply unit. The control unit is still further constructed for, subsequently to an implemented stabilization, in each case, at least temporarily activating the second voltage supply unit, the second electric consuming device and the switching unit such that the second voltage supply unit provides a charging voltage whose value is greater than the supply voltage provided by the first voltage supply unit, an electric current flows at least temporarily through the second electric consuming device, and a charging of the storage unit becomes possible by way of a current path formed by the second voltage supply unit and the second electric consuming device.

The object is also achieved by a method in which the following steps are implemented in a control unit:

(a) determining whether a stabilization of the voltage applied to the first electric consuming device is to be carried out;

(b) activating the switching unit as long as a stabilization is not to be carried out, such that the first electric consuming device is connected to the first voltage supply unit;

(c) activating the switching unit as soon as a stabilization is to be carried out, such that the first electric consuming device is connected to a series connection formed by the storage unit and the first voltage supply unit; and (d) activating the second voltage supply unit, the second electric consuming device and the switching unit subsequently to an implemented stabilization, in each case, at least temporarily such that: the second voltage supply unit provides a charging voltage whose value is greater than the supply voltage provided by the first voltage supply unit, an electric current flows through the second electric consuming device at least temporarily, and a charging of the storage unit becomes possible by way of a current path formed by the second voltage supply unit and the second electric consuming device.

The arrangement according to the invention and the method according to the invention are based on the following. On the one hand, a storage unit is provided which provides the energy that is required for the stabilization of the voltage applied to the first electric consuming device. On the other hand, a differentiation with respect to the electric consuming devices takes place between first and second consuming devices. The first consuming devices are those consuming devices that are voltage-sensitive and therefore should be supplied with a stabilized supply voltage. The second consuming devices are non-voltage-sensitive consuming devices which can be operated also with a non-stabilized supply voltage. The stabilization of the supply voltage required for the operation of the first consuming devices is achieved in that, if required, an additional storage unit is connected in series with the original voltage supply unit. As a result, during an operating state of the vehicle in which an increased energy demand is required for operating one or more electric consuming devices installed in the vehicle and which would actually lead to an unstable supply voltage, the electric energy stored in the storage unit can be used for stabilizing the supply voltage. The charging of the storage unit necessary after the stabilization has taken place is implemented by way of a second voltage supply unit and the second electric consuming device, which are both installed in the vehicle anyhow. Additional or larger-dimensioned components or even a charging circuit, which also is a fairly large component, provided specifically for the charging of the storage unit, will not be necessary. No additional installation space therefore has to be made available. On the whole, an arrangement and a corresponding method are provided which are cost-effective and easy to operate.

The above-mentioned task has therefore been achieved in its entirety.

As far as the activating of the second voltage supply unit, the second electric consuming device and the switching unit, is concerned, which takes place subsequently to the stabilization of the voltage applied to the first consuming device, the following is pointed out. It is therefore not absolutely necessary for the second voltage supply unit and the second electric consuming device to be activated such that the second voltage supply unit provides the increased charging voltage for a certain time period and, in the process, simultaneously the second electric consuming device is constantly activated with respect to the current flow. It is theoretically sufficient to activate solely the second voltage supply unit for providing the increased charging voltage without simultaneously activating the second electric consuming device. However, since a major voltage drop occurs at the storage unit when the second electric consuming device is activated such that current will flow through it, the second electric consuming device will be activated at least temporarily during the time period in which the second voltage supply unit provides the increased charging voltage.

The present invention is consequently used in a vehicle which has an internal-combustion engine and a first electric machine. The first electric machine is constructed for driving the internal-combustion engine at least temporarily. The control unit is further constructed, in order to determine whether a stabilization of the voltage applied to the first electric consuming device is to be carried out, for evaluating whether a restarting and/or an additional starting of the internal-combustion engine is to be implemented by the first electric machine. A large amount of electric energy is required especially for the restarting of an internal-combustion engine (vehicle with an automatic start-stop system) and for the additional starting of an internal-combustion engine (hybrid vehicle). When this amount of energy is taken from the voltage supply unit, which provides the supply voltage of the onboard power supply system, this results in a clear reduction of the supply voltage. This instability would lead to impairments of functions, or malfunctioning, in the case of the first consuming device (voltage-sensitive consuming device). Consequently, during the restarting or additional starting of the internal-combustion engine, the first consuming device is connected to a series connection formed by the first voltage supply unit and the storage unit and is supplied with voltage or electric energy by it.

As mentioned above, the first consuming device is a voltage-sensitive, particularly a starting-voltage-sensitive, consuming device. This may, for example, be a consuming device that is relevant to the driving operation. If a malfunctioning or function impairment were to occur in the case of such a consuming device, this could have the result that the driving operation can no longer be maintained in an unrestricted manner or this represents a danger potential for the further driving operation. Such a consuming device may, for example, be a system for controlling the yaw rate of the vehicle, a chassis control system, a steer-by-wire system, a brake-by-wire system or the like. The second consuming device advantageously is a non-voltage-sensitive, particularly a non-starting-voltage-sensitive, consuming device. This may, for example, be a consuming device that is not relevant to the driving operation. If a malfunctioning or function impairment were to occur in the case of such a consuming device, an unrestricted driving operation of the vehicle would nevertheless be possible. This may, for example, be a rear window heater, a seat heater, a fan, a blower or the like.

In a further development of the invention, a restarting of the internal-combustion engine that is to be carried out is detected when a start-driving signal is present in an idle state of the vehicle, in which case, in the idle state of the vehicle, the vehicle is stationary and the internal-combustion engine has stopped or has a rotational engine speed that is between a rotational shut-off speed and the zero value, and/or an additional starting of the internal-combustion engine is detected when, in a moving state of the vehicle, an engine torque demand is present, in which case, in the vehicle moving state, the vehicle is driving and the internal-combustion engine has stopped or has a rotational engine speed that is between a rotational shut-off speed and the zero value.

During the restarting as well as during the additional starting, an operative connection of the internal-combustion engine with the driven wheels of the vehicle is immediately imminent. The idle state of the vehicle as well as the moving state of the vehicle are focused on the fact that the internal-combustion engine is either at a standstill (zero engine rotational speed) or is carrying out a diminishing rotational movement (the engine rotational speed is between the shut-off rotational speed and the zero value). In the idle state of the vehicle, the vehicle speed should be zero, whereas, in the moving state of the vehicle, the rotational speed has a value different from zero.

The driving-start signal represents an immediate imminent driving start of the vehicle which is to begin from the idle state of the vehicle. Preferably, this should be a driving start initiated by the driver of the vehicle. A signal that represents the actuating of the clutch pedal by the driver can, for example, be used as the driving start signal. However, as an alternative, it may also be an automated driving start, thus a driving start initiated independently of the driver.

The engine torque demand represents a torque which is to be set by the internal-combustion engine in the present vehicle moving state dependent on the driver or independent of the driver. A torque to be set in a manner dependent on the driver is obtained, for example, by an actuation of the accelerator pedal by the driver. Consequently, in this case, the engine torque demand may be a quantity representing the accelerator pedal actuation. A longitudinal control system, for example, can generate an engine torque demand that is independent of the driver, the longitudinal control system being, for example, an adaptive cruise control system.

The shut-off rotational speed is that rotational engine speed of the internal-combustion engine which occurs during the dropping of the internal-combustion engine, i.e. during or immediately after the interruption of the operative connection to the driven wheels, for example, caused by the actuation of the clutch. In the first moment, the shut-off rotational speed can correspond to the rotational idling speed; depending on the operation, however, it may temporarily definitely also be above the rotational idling speed.

The restarting and additional starting of the internal-combustion engine differs from the initial starting of the internal-combustion engine, which is triggered for the first time by the driver after entering the vehicle at the beginning of a trip. During the initial starting, it is not necessary that the internal-combustion engine provides a defined large torque within a minimal time period. Whereas, during the restarting, for example, at a traffic light, a large torque has to be provided by the internal-combustion engine within a very short time. A corresponding situation exists during the additional starting of the internal-combustion engine in a vehicle moving state. In this case, the internal-combustion engine has to provide a torque correlating with the vehicle moving state within a very short time.

In a further development of the invention, the switching unit has a first switching element and a second switching element. The two switching elements are preferably arranged as a parallel connection, so that the switching unit can advantageously take up two different switching states. Specifically, a first switching state which is taken up in the case of a restarting and/or additional starting of the internal-combustion engine to be carried out and in which the first electric consuming device is connected to the series connection formed by the storage unit and the first voltage supply unit; and a second switching state which is otherwise taken up and in which the first electric consuming device solely is connected to the first voltage supply unit. After the restarting and/or additional starting has taken place, the switching unit is advantageously controlled such that it maintains the first switching state. The two switching elements are preferably implemented as MOSFET transistors.

In a further development of the invention, the storage unit is constructed as a capacitor, particularly as a supercapacitor. In comparison to batteries, capacitors are distinguished by the fact that they can be charged by means of simpler charging methods and clearly more rapidly, which increases the availability of the supplied device or system. In addition, they have a longer service life and also a higher power density. Supercapacitors are constructed as double-layer capacitors. These are the capacitors with the highest energy density. The high capacity of supercapacitors is based on the fact that ions dissociate in a liquid electrolyte and thereby form a dielectric which has a thickness of a few atomic layers and a large electrode surface.

In a further development of the invention, the second electric consuming device is connected to the first voltage supply unit. The second electric consuming device is a non-voltage-sensitive or non-starting-voltage-sensitive consuming device. This consuming device therefore does not absolutely have to be supplied with a stabilized voltage. It is therefore also not necessary to supply it even only temporarily by way of the series connection formed by the storage unit and the first voltage supply unit. It can be connected directly, i.e. without an intermediately connected switching element, with the first voltage supply unit. As a result, it is possible at any time to operate the second consuming device and to charge the storage unit by means of the current flowing through it.

The invention is advantageously used in a hybrid vehicle constructed as a parallel hybrid. The vehicle therefore has a second electric machine which is constructed for, alone or in combination with the internal-combustion engine, driving the driven wheels of the vehicle. In this case, the second voltage supply unit is a voltage transformer which is connected on the input side with a switching circuit containing the second electric machine. Since, in the case of a hybrid vehicle, the second electric machine is supplied with electric energy, a hybrid vehicle necessarily has a second storage unit constructed especially for this purpose and also arranged in the switching circuit. The voltage transformer can therefore be supplied either by way of the storage unit or by way of the second electric machine, whereby the demand-dependent providing of a charging voltage is ensured by the voltage transformer.

If, in contrast, the vehicle is constructed as a conventional vehicle, the second voltage supply unit advantageously is a generator present in the vehicle. Therefore, the demand-dependent providing of a charging voltage is also ensured in this case. In the case of a conventional vehicle, it is necessary to charge the storage unit after a restarting of the internal-combustion engine has taken place. Since the internal-combustion engine is running after a restarting, the generator is driven and a charging voltage required for the charging of the storage unit is therefore available.

In a further development of the invention, the control unit is further developed for evaluating a driver entrance signal and for initially charging the storage unit when a driver entrance is detected. This measure has the advantage that the storage unit is charged already during the startup operations of the vehicle or at the beginning of the drive, and, if required, a stabilization can thereby take place of the voltage applied to the first electric consuming device. The driver entrance is detected, for example, as a result of the actuation of the vehicle locking system by the driver or by detecting a signal permitting the entrance, as used for keyless entrance systems. As an alternative, instead of the driver entrance, the ignition actuation can be used as a triggering criterion for the initial charging.

For not having to use additional components for the stabilization of the voltage applied to the first electric consuming device and therefore not requiring additional space and additional costs, components already present in the vehicle are preferably used for implementing the arrangement according to the invention. Thus, the first electric machine advantageously is a starter present in the vehicle, and the first voltage supply unit is an onboard power supply system battery present in the vehicle.

It is understood that the above-mentioned characteristics, which will be explained in the following, can not only be used in the respectively indicated combinations but also in other combinations or alone without leaving the scope of the present invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
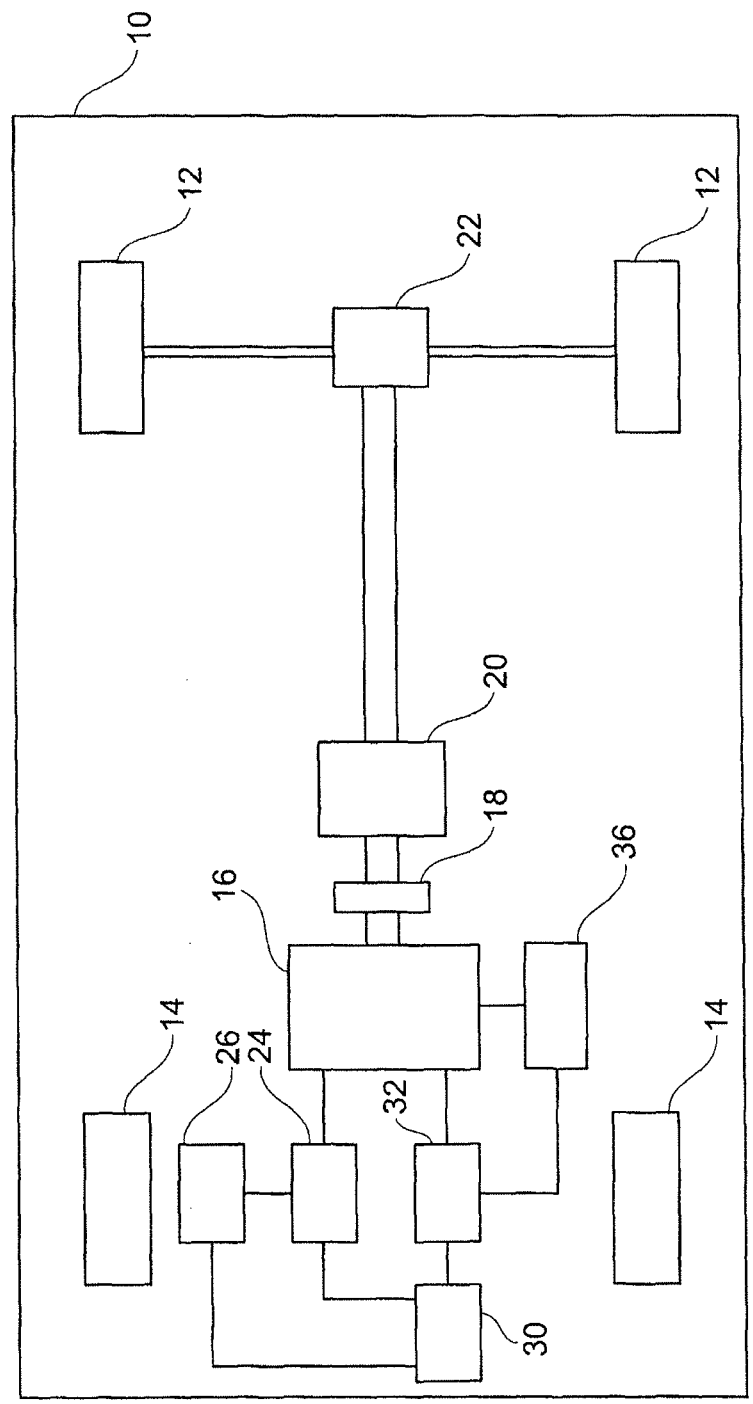
FIG. 1 is a schematic representation of a conventional vehicle equipped with the invention.

FIG. 1 illustrates a vehicle 10, which has driven wheels 12 and non-driven wheels 14. The vehicle 10 is to have a conventional construction, which means that it has only an internal-combustion engine 16 as the driving motor. The internal-combustion engine 16 can at least temporarily be operatively connected with the driven wheels 12 by way of a clutch 18, a transmission 20 and a differential 22 in order to generate a torque at the driven wheels 12 that causes the propulsion of the vehicle 10. The internal-combustion engine 16 is activated by way of an engine control unit 24. The engine control unit 24 receives the data required for this purpose from sensors 26. These may be sensors by which various quantities representing the operating state of the internal-combustion engine 16 are detected, for example, its rotational speed and/or temperature. However, by use of the sensors 26, quantities influencing the operation of the internal-combustion engine 16 can also be detected, such as the position of an accelerator pedal (not shown) and/or the temperature of the air supplied to the internal-combustion engine.

A so-called automatic start-stop system in implemented in the engine control unit 24, by which the internal-combustion engine 16 is switched off when the vehicle is standing still. In the presence of a defined switch-on condition, the internal-combustion engine 16 will be switched on again in an automated manner. A restarting of the internal-combustion engine is carried out, which differs from the starting of the internal-combustion engine 16 to be carried out initially at the beginning of the drive when the internal-combustion engine 16 is cold. For the restarting, a first electric machine 28, which will be described below and which drives the internal-combustion engine 16, is to be supplied with a correspondingly high current. The providing of such a current may lead to instabilities in the supply voltage in an onboard power supply system of the vehicle 10. In order to avoid or eliminate these instabilities or in order to be able to carry out a stabilization of the supply voltage, according to an embodiment of the invention, the vehicle 10 is quipped with a control unit 30 and a starting unit 32 activated by the latter.

The control unit 30 is constructed for determining whether or not a stabilization of the supply voltage is to be carried out. It evaluates for this purpose whether a restarting of the internal-combustion engine 16 is to be carried out by the first electric machine 28. For this purpose, a signal is supplied to the control unit 30 originating from the engine control unit 24, which signal represents a restarting of the internal-combustion engine 16 that is to be carried out. As long as a restarting is not to be carried out, the control unit 30 will initiate no measures stabilizing the supply voltage. However, as soon as a restarting is to be carried out, the control unit 30 will initiate stabilizing measures. A restarting to be carried out is detected in the engine control unit 24 when a driving start signal is present in an idle vehicle state. In this case, the idle state of the vehicle is defined such that the vehicle is at a standstill and the internal-combustion engine 16 is not running, or has a rotational engine speed between a shut-off rotational speed and the zero value. It is also contemplated that, when the quantities necessary for this purpose are correspondingly supplied, the detection of the restarting to be carried out takes place directly in the control unit 30. A signal can, for example, be used as a driving start signal which represents the actuation of a clutch pedal which is not shown.

In addition to the above-mentioned sensors, the sensors 26 also include sensors for detecting a driver entrance. A corresponding driver entrance signal is supplied to the control unit 30 in order to be able to initiate measures when a driver entrance is detected, which permit an initial charging of a storage unit 34 that will be described below.

The internal-combustion engine 16 is in an operative connection with a second voltage supply unit 36 which, in this case, is a generator. During operation, the internal-combustion engine 16 drives the generator 36, which will then provide a voltage that is used as a charging voltage in the arrangement.

The representation shown in FIG. 1, which illustrates a certain segmentation between the individual components, should not have a restrictive effect. Naturally, a different layout of individual components with a correspondingly resulting different functional segmentation is also contemplated. A corresponding situation applies to FIG. 3 described below.

Figure 2:
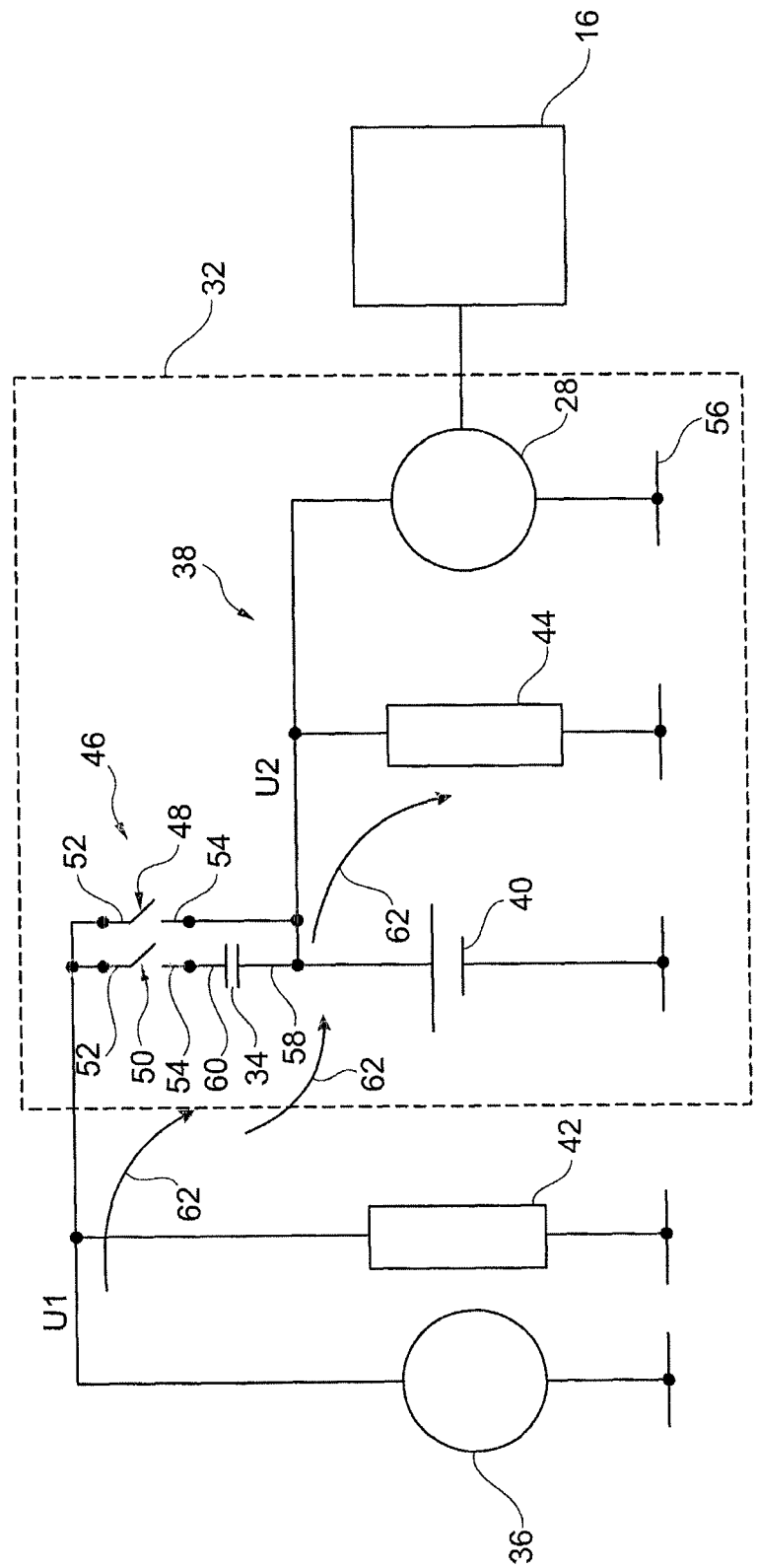
FIG. 2 is a schematic circuit diagram of the electric components used in the case of the conventional vehicle for the stabilization of the voltage applied to the first electric consuming device and for the starting of the internal-combustion engine, respectively.

By way of the schematic circuit diagram illustrated in FIG. 2, the construction of the starting unit 32 as well as its functionality are explained for the control unit 30 as well as for the starting unit 32. For reasons of clarity, the control unit 30 is not shown in FIG. 2.

By way of the control unit 30 and the starting unit 32, the supply voltage U2 in an onboard power supply system 38 of the vehicle 10 can be stabilized for certain electric consuming devices. In the case of the conventionally constructed vehicle 10, this is carried out when restarting the internal-combustion engine 16. The supply voltage U2 is supplied by a first voltage supply unit 40, which, in this case, is the onboard power supply battery. The onboard power supply system 38 has a number of first electric consuming devices 42, of which one is illustrated as an example. Furthermore, the onboard power supply system 38 has a number of second electric consuming devices 44, of which one is also shown as an example. The first electric consuming devices 42 are voltage-sensitive consuming devices, whereas the second electric consuming devices 44 are non-voltage-sensitive consuming devices. Electric energy is stored in the above-mentioned supply unit 34 constructed as a supercapacitor. The above-mentioned second voltage supply unit 36, which is constructed as a generator here, provides a charging voltage U1. The first electric machine 28 is, for example, the starter installed in the vehicle 10 anyhow.

The starting unit 32 also has a switching unit 46, which in turn has a first switching element 48 and a second switching element 50, wherein the two switching elements 48, 50 can be constructed as semiconductor elements, preferably as MOSFETs. Each of the two switching elements 48, 50 has a first switching element connection 52 and a second switching element connection 54, the two first switching element connections 52 being electrically connected with one another.

As illustrated in the representation of FIG. 2, the first electric machine 28, the second voltage supply unit 36, the first voltage supply unit 40, the first electric consuming device 42 and the second electric consuming device 44 each have two connections, of which one is connected with a reference potential 56, here ground. The connections not connected with the reference potential 56 are contacted as follows for implementing electric connections: (1) for the second voltage supply unit 36 and the first electric consuming device 42, the respective connections are connected with the first switching element connections 52; and (2) for the first electric machine 28, the first voltage supply unit 40 and the second electric consuming device 44, the respective connections are connected with the second switching element connection 54 of the first switching element 48 as well as with a first storage unit connection 58 of the storage unit 34. A second storage unit connection 60 of the storage unit 34 is connected with the second switching element connection 54 of the second switching element 50.

As mentioned above, the control unit 30 is constructed for determining whether a stabilization of the voltage applied to the first electric consuming device 42 is to be carried out because of a restarting of the internal-combustion engine 16. As long as such a stabilization is not to be carried out, the control unit 30 will activate the switching unit 46 such that the latter takes up a second switching state in which the first switching element 48 is closed and the second switching element 50 is open. The first electric consuming device 42 is therefore solely connected to the first voltage supply unit 40 and is supplied by its voltage. As soon as the above-mentioned stabilization is to be carried out, the control unit 30 will activate the switching unit 46 such that the latter takes up a first switching state, in which the first switching element 48 is open and the second switching element 50 is closed. The first electric consuming device 42 is thereby connected to a series connection formed of the storage unit 34 and the first voltage supply unit 40. Because of the additional voltage provided by the storage unit 34, the first electric consuming device 42 will obtain a stable voltage supply during the restarting operation. Should the current provided by the storage unit 34 not be sufficient for stabilizing the first electric consuming device 42 during the complete restarting operation, the second voltage supply unit 36 can additionally supply energy for the stabilization.

Subsequent to the implemented stabilization or after the termination of the restarting operation, the control unit 30 activates the second voltage supply unit 36, the second electric consuming device 44 and the switching unit 46 as follows. The switching unit 46 is activated such that it continues to take up the first switching state. The second voltage supply unit 36 is activated such that it provides a charging voltage U1 whose value is greater than the supply voltage U2 provided by the first voltage supply unit 40. The second electric consuming device 44 is activated such that an electric current flows through it at least temporarily, and a charging of the storage unit 34 can take place by way of a current path 62 formed by the second voltage supply unit 36 and the second electric consuming device 44. During the charging operation, the charging voltage U1 provided by the second supply unit is raised, for example, to a value of approximately 15.5 V, so that, in the case of a supply voltage U2 of the order of approximately 12V, a voltage of the order of approximately 3.5V will occur at the storage unit 34. After the termination of the charging operation, the control unit 30 activates at least the switching unit 46, specifically such that the first switching element 48 is closed and the second switching element 50 is open.

When a driver entrance is detected, an initial charging of the storage unit 34 is caused, which, with respect to the time, preferably takes place immediately after the starting of the internal-combustion engine 16 by the driver. During this charging, the control unit 30 activates the second voltage supply unit 36, the second electric consuming device 44 and the switching unit 46 correspondingly in the manner described above in connection with the charging operation subsequent to the restarting operation.

For reasons of clarity, FIG. 2 does not show further components which are normally present in a vehicle for the operation of the components illustrated in FIG. 2. One example is a switch by which the first electric machine 28 can be separated from the first voltage supply unit 38. The omission of these components should have no limiting effect. A corresponding situation applies to the representation in FIG. 4.

Figure 3:
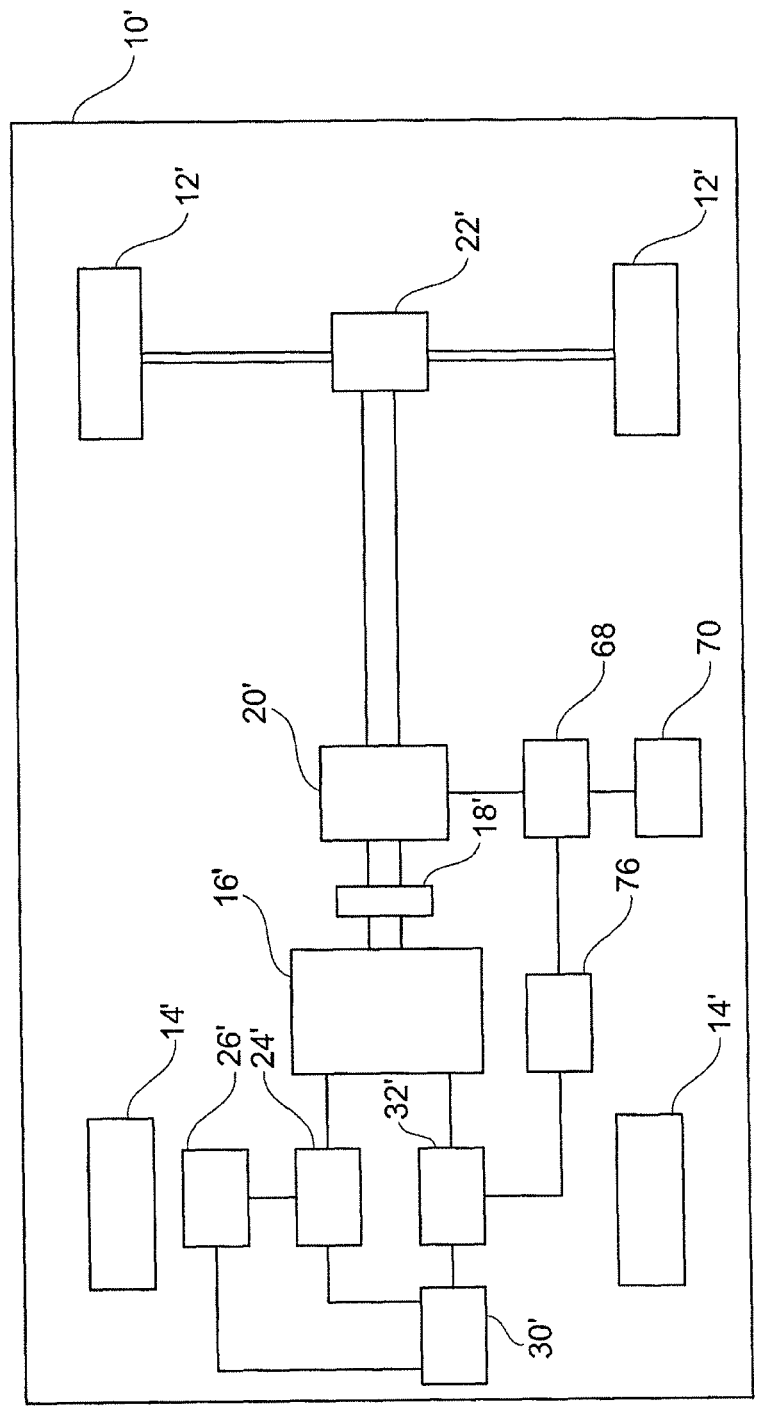
FIG. 3 is a schematic representation of a hybrid vehicle equipped with the invention.

FIG. 3 illustrates a vehicle 10' constructed as a hybrid vehicle which is designed as a parallel hybrid vehicle, preferably with the functionality of a plug-in hybrid. The vehicle 10' can but does not have to be equipped with an automatic start-stop system. With respect to its functionality, reference is made to the above-indicated statements made in connection with FIGS. 1 and 2. Components illustrated in FIGS. 3 and 4, which have the same or a corresponding functionality as the components illustrated in FIGS. 1 and 2, are marked with the same reference number which, however, is provided with an apostrophe-like symbol. Reference is made here to the statements made in connection with FIGS. 1 and 2. In the following, only the additional components and the changed functionalities, respectively, will be described.

In addition to the internal-combustion engine 16', the vehicle 10' has a second electric machine 64 which can drive the driven wheels 12' of the vehicle 10' by way of the transmission 20' and the differential 22'. This can take place alone or in combination with the internal-combustion engine 16'. The second electric machine 64 may, for example, be designed as a synchronous machine, particularly as a hybrid synchronous machine, or as an asynchronous machine. It is supplied by a high-voltage storage device 66 with an electric high voltage U0, which may be of the order of from 200V to 400V. The second electric machine 64 and the high-voltage storage device 66 are shown combined in FIG. 3 as an electric drive unit 68 which is activated by a correspondingly setup electronic power system 70. In addition to the electric machine 64, a number of third electric consuming devices 72 are also supplied with the high voltage U0, of which one is illustrated as an example. A third electric consuming device 72 may, for example, be an air-conditioning compressor. The above-indicated value range for the voltage U0 should have no limiting effect. It is also contemplated to use the invention in connection with electrification architectures, where the voltage U0 is far below the above-mentioned lower limit or far above the above-mentioned upper limit; for example, values for the voltage U0 of from 20V to 600V are contemplated.

The second electric machine 64, the high-voltage storage device 66 and the third electric consuming devices 72 form a switching circuit 74, to which a voltage transformer 76 is connected with its input side. The voltage transformer 76 transforms the high voltage U0 into a low voltage U1', which is of the order of the supply voltage U2' provided by the first voltage supply unit 40'. The voltage transformer 76 represents a second voltage supply unit by which the charging voltage U1' can be provided. The voltage transformer 76 is a DC converter which contains at least one switchable semiconductor element. By changing the switching times of this semiconductor element, the voltage U1' provided by the voltage transformer 76 can be adjusted. The voltages U0', U1' and U2' are DC voltages. The corresponding situation applies to the voltages U1 and U2.

It should be mentioned at this point that the schematic representation in FIG. 3 is reduced to the essential components of the transmission line. The linking of the second electric machine 64 to the transmission 20' illustrated in this representation should have no limiting effect on the concrete mechanical further development. The second electric machine 64 can naturally be operatively integrated, for example, between the clutch 18' and the transmission 20'.

The hybrid vehicle 10' is equipped with an additional-starting functionality by which an additional start of the internal-combustion engine 16' can take place in certain operating states of the vehicle 10'. In these operating states, the vehicle is driving and therefore has a vehicle speed. However, the internal-combustion engine 16' is not operatively connected with the driven wheels 12' for generating a torque acting upon them. The torque necessary for the propulsion of the vehicle 10' originates from the second electric machine 64. During such a vehicle movement caused by the second electric machine 64, the torque necessary for the propulsion should now no longer be generated by the second electric machine 64 but by the internal-combustion engine 16' at the driven wheels 12'; for example, because the vehicle speed is to be increased to a value at which the torque is advantageously no longer provided by the second electric machine 64 but by the internal-combustion engine 16'. In order to ensure that the transition in the providing of the torque is not noticeable to the driver, i.e. is jolt-free, it is necessary that, during the additional starting, the internal-combustion engine 16' provides a defined high torque within a short time period. The additional starting takes place by way of a first electric machine 28'. Corresponding to the above-described restarting, the first electric machine 28' has to be supplied for this purpose with a correspondingly high current. Also during the additional starting, the providing of such a current in the onboard power supply system 38' of the vehicle 10' may lead to instabilities in the supply voltage U2'. In order to avoid or eliminate these instabilities, or in order to be able to carry out a stabilization of the supply voltage for individual electric consuming devices, a control unit 30' and a starting unit 32' activated by the latter are further developed correspondingly.

The control unit 30' is designed for evaluating whether an additional starting of the internal-combustion engine 16' is to be carried out by the first electric machine 28'. For this purpose, a corresponding signal is supplied to the control unit 30' originating from the engine control unit 24', which signal represents an additional starting of the internal combustion engine 16' to be carried out. As long as an additional starting is not to be carried out, the control unit 30' will initiate no measures by which the voltage applied to a first electric consuming device 42' can be stabilized. However, as soon as an additional starting is to be carried out, the control unit 30' will initiate stabilizing measures. In the engine control unit 24', it is recognized that an additional starting of the internal-combustion engine 16' is to be carried out when an engine torque demand is present in a vehicle moving state. In this case, the vehicle moving state is defined such that the vehicle 10' is driving and the internal-combustion engine 16' is not running or has a rotational engine speed between a shut-off rotational speed and the zero value. It is also contemplated that the recognition of the additional starting to be carried out takes place by a corresponding supplying of the quantities necessary for this purpose directly in the control unit 30'. An engine torque demand exists, for example, when a signal is present that represents an actuating of an accelerator pedal, that is not shown, by the driver. In addition and/or as an alternative, a signal may be present which is generated by a longitudinal control system. The vehicle 10' is equipped with corresponding sensors 26'.

As mentioned above, the hybrid vehicle 10' may, in addition, be equipped with an automatic start-stop system. With respect to the further development of the individual components required for this purpose, reference is made to the statements in connections with FIGS. 1 and 2.

Figure 4:
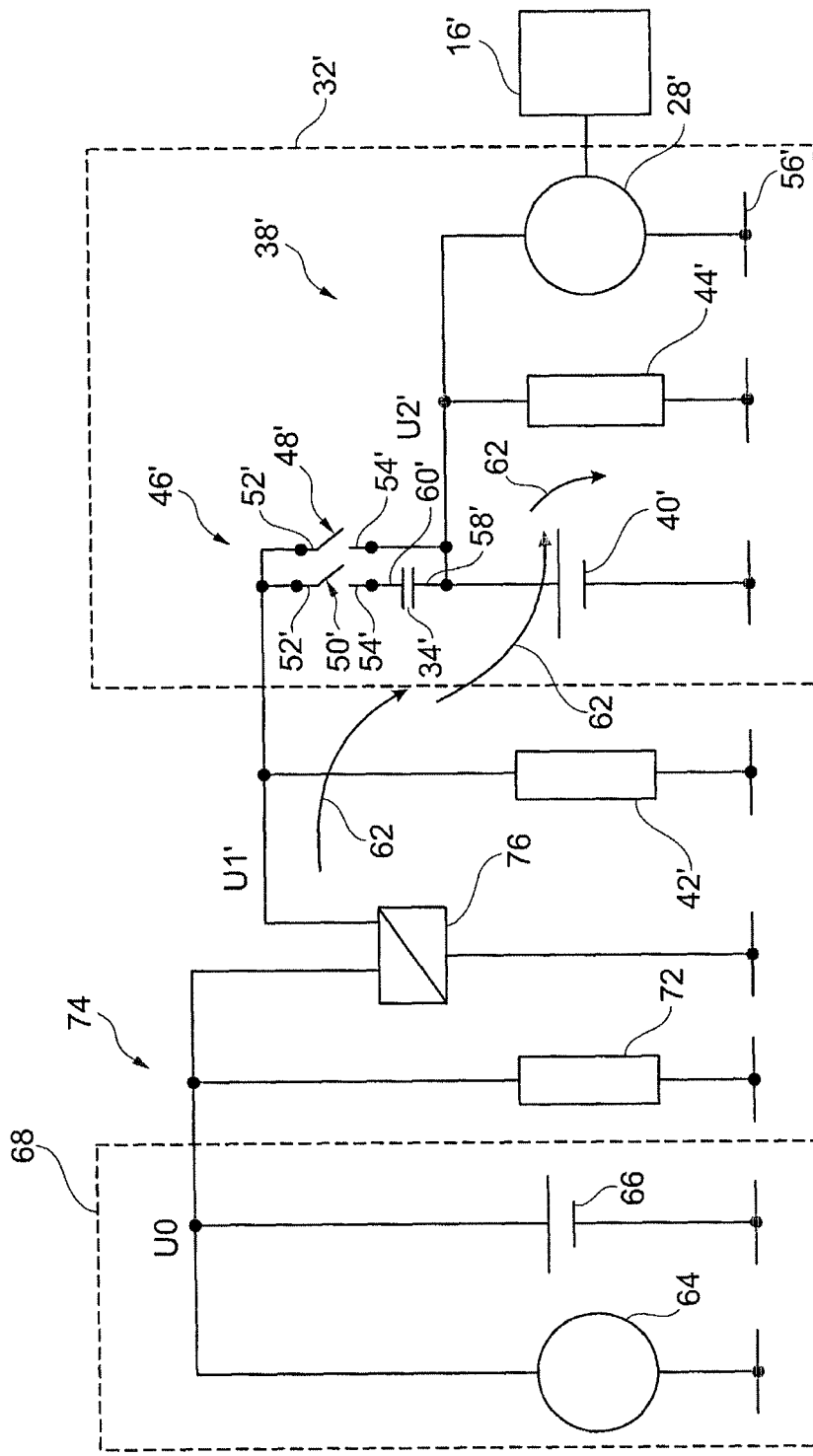
FIG. 4 is a schematic circuit diagram of the electric components used in the case of the hybrid vehicle for the stabilization of the voltage applied to the first electric consuming device and for the starting of the internal-combustion engine, respectively.

FIG. 4 shows, among other things, the construction of a starting unit 32'. With respect to its concrete construction, referenced is made to the statements in connection with FIGS. 1 and 2. As far as the interconnection is concerned of the first electric machine 28, of the storage unit 34, of the first voltage supply unit 40, of the first electric consuming device 42, of the second electric consuming device 44, of the switching unit 46 and of the voltage transformer 76, reference is made to the statements concerning FIG. 2, here, the second voltage supply unit 36 corresponding to the voltage transformer 76.

As a result of the use of the control unit 30' and of the starting unit 32', the voltage applied to the first electric consuming device 42' can be stabilized. For this purpose, the control unit 30' determines whether a stabilization is to be carried out on the basis of a restarting of the internal-combustion engine 16' to be implemented. As long as such a stabilization is not to be carried out, the control unit 30' will control the switching unit 46' such that the latter takes up the second switching state. The first electric consuming device 42' alone is therefore connected to the first voltage supply unit 40'. As soon as the above-mentioned stabilization has to be carried out, the control unit 30' will activate the switching unit 46' such that the latter takes up the first switching state. The first electric consuming device 42' is therefore connected to a series connection formed of the storage unit 34' and the first voltage supply unit 40'. Should the current provided by the storage unit 34' not be sufficient for stabilizing the first electric consuming device 42' during the complete additional starting operation, the voltage transformer 76 can additionally provide energy for the stabilization.

Subsequent to the implemented stabilization of the voltage applied to the first electric consuming device 42', or after the termination of the restarting operation, the control unit 30' will activate the voltage transformer 76, the second electric consuming device 44' and the switching unit 46' in the following manner. The switching unit 46' is activated such that it continues to take up the first switching state. The voltage transformer 76 is activated such that the latter provides a charging voltage U1' whose value is greater than a supply voltage U2' provided by the first voltage supply unit 40'. The second electric consuming device 44' is activated such that an electric current flows at least temporarily, and thereby a charging of the control unit 34' becomes possible by way of a current path 62 formed of the voltage transformer 76 and the second electric consuming device 44'. During the charging operation, the voltage transformer 76 is activated such that the charging voltage U1' is raised, for example, to a value of approximately 15.5V, so that, in the case of a supply voltage U2' of the order of approximately 12V, a voltage of the order of approximately 3.5V will occur at the storage unit 34'. After the termination of the charging operation, the control unit 30' activates at least the switching unit 46', specifically such that the first switching element 48' is closed and the second switching element 50 is open.

When a driver entrance is detected, an initial charging of the storage unit 34' is caused. With respect to the approach, reference is made to the statements made in connection with FIG. 2, in which case, here, the voltage transformer 76 is activated instead of the second voltage supply unit 36.

At this point, the following should again be stressed. The functionality scope that can be implemented by the control unit 30' and the starting unit 32' differs according to the level of equipment of the hybrid vehicle 10'. If the hybrid vehicle 10' it not equipped with an automatic start-stop system, both units can carry out only an additional starting operation. In contrast, if the hybrid vehicle 10' is equipped with an automatic start-stop system, both units can additionally carry out a restarting operation.

Finally, the advantages of the invention should be explained again. By means of the invention, it becomes possible to accomplish the energy supply in an onboard power supply system during the additional starting and/or restarting of an internal-combustion engine solely by use of components already installed in the vehicle. No further components, such as additional-start batteries, are required. In addition, it is not necessary for the electric machine provided in a hybrid vehicle for the implementation of the propulsion to have larger dimensions than required for meeting the propulsion demands. In addition, as a result of the advantageous interconnection in the onboard power supply system according to the invention and the accompanying operating strategy, the use of charge switches for charging the storage unit is not necessary. On the whole, the system for stabilizing the supply voltage can be constructed in a cost-effective manner.

The arrangement according to the invention and the pertaining method were set forth above as an arrangement and a method for stabilizing a voltage applied to a first electric consuming device arranged in an onboard power supply system of a vehicle. However, the arrangement and the method can also be considered to be an arrangement and a method for starting, particularly additionally starting and restarting an internal-combustion engine, wherein a stabilizing of the supply voltage for individual electric consuming devices is carried out.

LIST OF REFERENCE NUMBERS

10 Vehicle
12 Driven wheels
14 Non-driven wheel
16 Internal-combustion engine
18 Clutch
20 Transmission
22 Differential 24 Engine control unit
26 Sensors
28 First electric machine
30 Control unit
32 Starting unit
34 Storage unit
36 Second voltage supply unit
38 Onboard power supply system
40 First voltage supply unit
42 First electric consuming device
44 Second electric consuming device
46 Switching unit
48 First switching element
50 Second switching element
52 First switching element connection
54 Second switching element connection
56 Reference potential
58 First storage unit connection
60 Second storage unit connection
62 Current path
64 Second electric machine
66 High-voltage storage device
68 Electric drive unit
70 Electronic power system
72 Third electric consuming device
74 Switching circuit
76 Voltage transformer The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for stabilizing a voltage in a vehicle onboard power supply system having a first, voltage-sensitive electric consuming device and a second, non-voltage-sensitive electric consuming device, comprising:
    a first voltage supply unit configured to provide a supply voltage;
    a storage unit configured to store electric energy at least temporarily;
    a second voltage supply unit configured to provide a charging voltage;
    a switching unit to which at least the first, voltage-sensitive electric consuming device, the storage unit, the first voltage supply unit and the second voltage supply unit are connected;
    a control unit operatively configured to determine whether a stabilization of the voltage applied to the first, voltage-sensitive electric consuming device is to be carried out, wherein the control unit is further configured such that:
    as long as a stabilization is not to be carried out, activate the switching unit to connect the first, voltage-sensitive electric consuming device to the first voltage supply unit and, as soon as the stabilization is to be carried out, activate the switching unit to connect the first, voltage-sensitive electric consuming device to a series connection formed by the storage unit and the first voltage supply unit in order to thereby supply the first, voltage-sensitive electric consuming device with a voltage provided by the series connection in order to compensate for any reduction of the supply voltage that is present, subsequent to stabilization having been carried out, in each case, at least temporarily activate the second voltage supply unit, the second, non-voltage-sensitive electric consuming device and the switching unit, wherein the second voltage supply unit provides the charging voltage having a value greater than the supply voltage of the first voltage supply unit, and electric current flows at least temporarily through the second, non-voltage sensitive electric consuming device, and a charging of the storage unit is made possible by a current path formed by the second voltage supply unit and the second, non-voltage-sensitive electric consuming device.

2. The arrangement according to claim 1, further comprising:
    an internal-combustion engine of the vehicle;
    a first electric machine of the vehicle; and
    wherein the first electric machine is operatively configured for at least temporarily driving the internal-combustion engine, and
    wherein the control unit is further operatively configured to determine whether a stabilization of the voltage applied to the first, voltage-sensitive electric consuming device is to be carried out in order to evaluate whether at least one of a restarting and additional starting of the internal-combustion engine is to be implemented via the first electric machine.

3. The arrangement according to claim 2, wherein:
    the restarting of the internal-combustion engine that is to be carried out is detected when a start-driving signal is present in an idle state of the vehicle in which the vehicle is stationary and the internal-combustion engine has stopped or has a rotational engine speed between a rotational shut-off speed and a zero value; and
    the additional starting of the internal-combustion engine is detected when, in a moving state of the vehicle, an engine torque demand is present, the vehicle moving state being a state in which the vehicle is driving and the internal-combustion engine has stopped or has a rotational engine speed between a rotational shut-off speed and a zero value.

4. The arrangement according to claim 1, wherein the switching unit comprises a first switching element and a second switching element.

5. The arrangement according to claim 4, wherein the storage unit is a capacitor.

6. The arrangement according to claim 4, wherein the storage unit is a super capacitor.

7. The arrangement according to claim 4, wherein the second, non-voltage-sensitive electric consuming device is connected to the first voltage supply unit.

8. The arrangement according to claim 2, further comprising:
    a second electric machine of the vehicle, the second electric machine being operatively configured to drive driven wheels of the vehicle either alone or in combination with the internal-combustion engine; and
    wherein the second voltage supply unit is a voltage transformer operatively connected on an input side with a switching circuit containing the second electric machine.

9. The arrangement according to claim 1, wherein the second voltage supply unit is a generator.

10. The arrangement according to claim 1, wherein the control unit is further operatively configured to evaluate a driver entrance signal and, when a driver entrance is detected, initially charge the storage unit.

11. A method of stabilizing a voltage applied to a first voltage-sensitive electric consuming device arranged in an onboard power supply system of a vehicle, the onboard power supply system also having a second, non-voltage-sensitive electric consuming device and a first voltage supply unit that provides a supply voltage, as well as a storage unit configured to store electric energy at least temporarily, a second voltage supply unit that provides a charging voltage, a switching unit that has connected thereto the first, voltage-sensitive electric consuming device, the storage unit, the first voltage supply unit and the second voltage supply unit, wherein a control unit for the onboard power supply system executes, the method comprising the acts of:
  determining whether a stabilization of the voltage applied to the first, voltage-sensitive electric consuming device is to be carried out;
  activating the switching unit as long as the stabilization is not to be carried out such that the first, voltage-sensitive electric consuming device is connected to the first voltage supply unit;
  activating the switching unit as soon as the stabilization is to be carried out such that the first, voltage-sensitive electric consuming device is connected to a series connection formed by the storage unit and the first voltage supply unit in order to thereby supply the first, voltage-sensitive electric consuming device with a voltage provided by the series connection in order to compensate for any reduction of the supply voltage that is present; and
  activating the second voltage supply unit, the second, non-voltage-sensitive electric consuming device and the switching unit subsequent to carrying out the stabilization, in each case, at least temporarily such that:
    the second voltage supply unit provides the charging voltage having a value greater than the supply voltage of the first voltage supply unit,
    an electric current flows through the second, non-voltage-sensitive electric consuming device at least temporarily, and
    charging of the storage unit is made possible via a current path formed by the second voltage supply unit and the second, non-voltage-sensitive electric consuming device.

12. A computer product for implementing a method of stabilizing a voltage applied to a first, voltage-sensitive electric consuming device arranged in an onboard power supply system of a vehicle, the onboard power supply system also having a second, non-voltage-sensitive electric consuming device and a first voltage supply unit that provides a supply voltage, as well as a storage unit configured to store electric energy at least temporarily, a second voltage supply unit that provides a charging voltage, a switching unit that has connected thereto the first, voltage-sensitive electric consuming device, the storage unit, the first voltage supply unit and the second voltage supply unit, wherein a control unit controls the onboard power supply system, the computer product comprising:
  a non-transitory computer readable medium having stored thereon program code segments that:
    determine whether a stabilization of the voltage applied to the first, voltage-sensitive consuming device is to be carried out;
    activate the switching unit as long as the stabilization is not to be carried out such that the first, voltage-sensitive electric consuming device is connected to the first voltage supply unit;
    activate the switching unit as soon as the stabilization is to be carried out such that the first, voltage-sensitive electric consuming device is connected to a series connection formed by the storage unit and the first voltage supply unit in order to thereby supply the first, voltage-sensitive electric consuming device with a voltage provided by the series connection in order to compensate for any reduction of the supply voltage that is present; and
    activate the second voltage supply unit, the second, non-voltage-sensitive electric consuming device and the switching unit subsequent to carrying out the stabilization, in each case, at least temporarily such that:
      the second voltage supply unit provides the charging voltage having a value greater than the supply voltage of the first voltage supply unit,
      an electric current flows through the second, non-voltage-sensitive electric consuming device at least temporarily, and
      charging of the storage unit is made possible via a current path formed by the second voltage supply unit and the second, non-voltage-sensitive electric consuming device.

* * * * *